United States Patent
Smith

(10) Patent No.: US 11,720,676 B2
(45) Date of Patent: Aug. 8, 2023

(54) METHODS AND APPARATUS TO CREATE MALWARE DETECTION RULES

(71) Applicant: McAfee, LLC, Santa Clara, CA (US)

(72) Inventor: Nicholas T. Smith, Hillsboro, OR (US)

(73) Assignee: McAfee, LLC, Santa Clara, CA (US)

(*) Notice: Subject to any disclaimer, the term of this patent is extended or adjusted under 35 U.S.C. 154(b) by 944 days.

(21) Appl. No.: 16/446,196

(22) Filed: Jun. 19, 2019

(65) Prior Publication Data
US 2020/0401697 A1 Dec. 24, 2020

(51) Int. Cl.
*G06F 21/56* (2013.01)
*G06N 20/00* (2019.01)
*G06N 5/02* (2023.01)

(52) U.S. Cl.
CPC ........... *G06F 21/566* (2013.01); *G06N 5/027* (2013.01); *G06N 20/00* (2019.01); *G06F 2221/034* (2013.01)

(58) Field of Classification Search
CPC .................................................... G06F 21/566
See application file for complete search history.

(56) References Cited

U.S. PATENT DOCUMENTS 8,955,122 B2* 2/2015 Gu ..................... G06F 21/566
702/78
10,075,415 B2* 9/2018 Cianfrocca ......... H04L 63/0227

OTHER PUBLICATIONS

Friedman et al., "Predictive Learning via Rule Ensembles," Institute of Mathematical Statistics, vol. 2, No. 3, 2008, pp. 916-954, Stanford University, https://projecteuclid.org/euclid.aoas/1223908046.
Ahmad et al., "Interpretable Machine Learning in Healthcare," IEEE, IEEE Intelligent Informatics Bulletin, vol. 19, No. 1, Aug. 2018, 7 pages.
Saad et al.,"The Curious Case of Machine Learning in Malware Detection," arXiv:1905.07573v1 [cs.CR], [https://doi.org/10.48550/arXiv.1905.07573], May 18, 2019, 9 pages.
Cohen, "Fast Effective Rule Induction," Machine Learning: Proceedings of the Twelfth International Conference (ML95), 1995, 10 pages.
Quinlan, "C4.5: Programs for Machine Learning," Morgan Kaufmann Publishers, Inc., 1993, submitting book review, 6 pages.
Lavrač et al., "Inductive Logic Programming: Techniques and Applications," Prentice Hall, 1994, submitting book review, 6 pages.
Thomson et al., "Human, Model and Machine: A Complementary Approach to Big Data," ACM, HCBDR '14, Apr. 1, 2014, 5 pages.

(Continued)

*Primary Examiner* — Simon P Kanaan
(74) *Attorney, Agent, or Firm* — Hanley, Flight & Zimmerman, LLC

(57) ABSTRACT

Methods, apparatus, systems and articles of manufacture to create malware detection rules are disclosed. An example apparatus includes a rule generator to generate an augmented rule set based on a first training data set. A matrix generator is to create a matrix using the augmented rule set and a second training data set. A rule regulator to apply regularization to the augmented rule set based on the matrix to remove any number of rules from the augmented rule set, the rule regulator to create a reduced rule set. A reduced rule set checker to validate the reduced rule set.

22 Claims, 8 Drawing Sheets

(56) References Cited

OTHER PUBLICATIONS

Breiman, "Random Forests," Kluwer Academic Publishers, Machine Learning, vol. 45, 2001, 28 pages.
Friedman, "Greedy Function Approximation: A Gradient Boosting Machine," The Annals of Statistics, vol. 29, No. 5, 2001, 44 pages.
Tibshirani, "Regression Shrinkage and Selection via the Lasso," Royal Statistical Society, J. R. Statist. Soc. B (1996), vol. 58, No. 1, 1996, 22 pages.
Hyafil et al., "Constructing Optimal Binary Decision Trees is NP-Complete," Information Processing Letters, vol. 5, No. 1, May 1976, 3 pages.
Breiman et al., "Classification and Regression Trees," Routledge, 2017, submitting book review, 2 pages.
Rivest, "Learning Decision Lists," Kluwer Academic Publishers, Machine Learning, vol. 2, 1987, 18 pages.
Molnar, "Interpretable Machine Learning: A Guide for Making Black Box Models Explainable," Leanpub, Feb. 21, 2019, 251 pages.
Breiman, "Bagging Predictors," Kluwer Academic Publishers, Machine Learning, vol. 24, 1996, 18 pages.
Friedman et al., "Additive Logistic Regression: A Statistical View of Boosting," The Annals of Statistics, vol. 28, No. 2, 2000, 71 pages.
Mason et al., "Boosting Algorithms as Gradient Descent," Advances in Neural Information Processing Systems 12, 1999, 7 pages.
Pedregosa et al., "Scikit-learn: Machine Learning in Python," arXiv:1201.0490v4 [cs.LG], Journal of Machine Learning Research 12 (2011), Jun. 5, 2018, 6 pages.
Fan et al., "Liblinear: A Library for Large Linear Classification," Journal of Machine Learning Research 9, 2008, 4 pages.
Kaggle, "Titanic—Machine Learning from Disaster," Kaggle Inc., [https://www.kaggle.com/c/titanic/data] retrieved on Mar. 2, 2023, 4 pages.
Hunter, "Matplotlib: A 2D Graphics Environment," IEEE, Computing in Science & Engineering, May/Jun. 2007, 6 pages.
Van Der Walt et al., "The NumPy Array: A Structure for Efficient Numerical Computation," arXiv:1102.1523v1 [cs.MS], IEEE Computing in Science and Engineering, Feb. 8, 2011, 8 pages.
SciPy, "SciPy: Fundamental Algorithms for Scientific Computing in Python," SciPy, [https://scipy.org/] retrieved on Mar. 2, 2023, 2 pages.
Friedman et al., "Rule Based Learning Ensembles: RuleFit3 with R," [https://jerryfriedman.su.domains/R_RuleFit.html] retrieved on Mar. 2, 2023, 3 pages.
Kohavi, "Scaling Up the Accuracy of Naive-Bayes Classifiers: A Decision-Tree Hybrid," KDD'96: Proceedings of the Second International Conference on Knowledge Discovery and Data Mining, Aug. 1996, 6 pages.
Nagpal, "L1 and L2 Regularization Methods," Towards Data Science, Oct. 13, 2017, [https://towardsdatascience.com/l1-and-l2-regularization-methods-ce25e7fc831c] retrieved on Mar. 2, 2023, 4 pages.

* cited by examiner

METHODS AND APPARATUS TO CREATE MALWARE DETECTION RULES

FIELD OF THE DISCLOSURE

This disclosure relates generally to malware detection, and, more particularly, to methods and apparatus to create malware detection rules.

BACKGROUND

Malware (e. g, viruses, worms, trojans, ransomware) is malicious software that is disseminated by attackers to launch a wide range of security attacks, such as stealing a user's private information, hijacking devices remotely to deliver massive spam emails, and infiltrating a user's online account credentials. Malware has caused serious damages and significant financial loss to many computer and Internet users.

Figure 1:
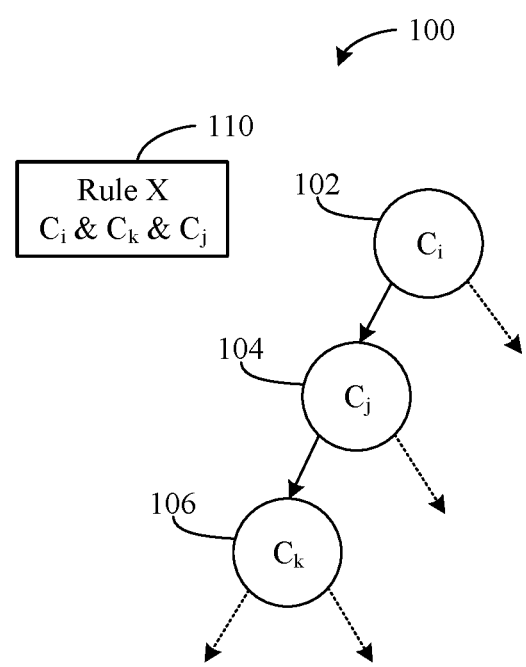
FIG. 1 is a schematic describing an example of a decision tree used to generate and signify rules (e.g. branches) either followed or not followed by an example data point.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Recent years have witnessed great advances in black-box machine learning methods. However, many applications benefit from more interpretable models. In a range of fields from cybersecurity to medicine, it is crucial to understand why a model produces the result it does. This understanding enables insight, model validation, and more informed follow-up decision making. Interpretable machine learning can be used as a tool to enhance the abilities of domain experts instead of replacing the domain experts. Rule based methods are highly interpretable models that functions using easy to understand rules.

Examples disclosed herein can be used to detect malware using rules and/or models. Further, examples disclosed herein enable enhanced introspection into the way in which a trained machine learning model makes predictions. That is, rules may be analyzed by researchers to, for example, validate the system and/or use the generated rules to identify trends and/or features that are indicative of malware.

In terms of data mining, examples disclosed herein automatically identify patterns that are highly discriminative of either malware or benign software. Example approaches disclosed herein utilize an input dataset where each record (e.g., executable file, script, a set of machine readable instructions, etc.) is labeled as either being malware or benign software. The invention produces two primary outputs: a set of rules and a machine learning model. In examples disclosed herein, the set of rules is implemented by decision lists. In examples disclosed herein, decision lists are a representation for Boolean functions that can be used to generate an output (e.g., true or false). A decision list is a conjunction of conditions. In other words, a decision list is like a decision tree that does not branch at decision tree split points. Example approaches disclosed herein utilize decision lists as opposed to decision trees, which are typically implemented as a single tree that may include many branches and nodes. As a result, deeply nested structures of a decision tree create complex decision boundaries and are more computationally intensive to execute. In contrast, decision lists are typically more computationally efficient to execute. The utilization of decision lists in machine learning training and validation is advantageous as it allows faster rule iteration and the consideration of more data during model training.

Decision lists, like decision trees, are constructed using randomized greedy algorithms. As a result, some rules included in the decision list might not perform well. For example, the use of a greedy algorithm prioritizing accuracy can isolate rules that are very accurate for only a small number of samples. This might not perform well when applied in training. This phenomenon is more exaggerated when there are numerous features to consider as inputs to the rules. Moreover, some rules may result in ambiguous answers.

FIG. 1 is a schematic describing an example of a decision list used to generate and signify rules either followed or not followed by an example data point. FIG. 1 describes a decision list 100 for Rule X. In this application, Rule X is described by the union of qualities $C_i$ in block 102, $C_j$ in block 104, and $C_k$ in block 106. For a piece of data, in this example a piece of software, to be said to follow Rule X it must fulfill all the conditions and qualities of $C_i$ 102, $C_j$ 104, and $C_k$ 106. For example, if a piece of data was said to follow conditions of only $C_i$ 102 and $C_j$ 104 and not $C_k$ 106 then the piece of data would not follow Rule X. Though three conditions are listed for Rule X 110, a rule can have any number of conditions. A predictive model can be constructed by associating decision tree rules of known data with a known overarching quality of the piece of data and applying it to pieces of data in a similar format but without knowledge of the overarching quality of the piece of data. In example approaches disclosed herein, rules are created to attempt to detect features associated with malware or, conversely, benign software.

Figure 2:
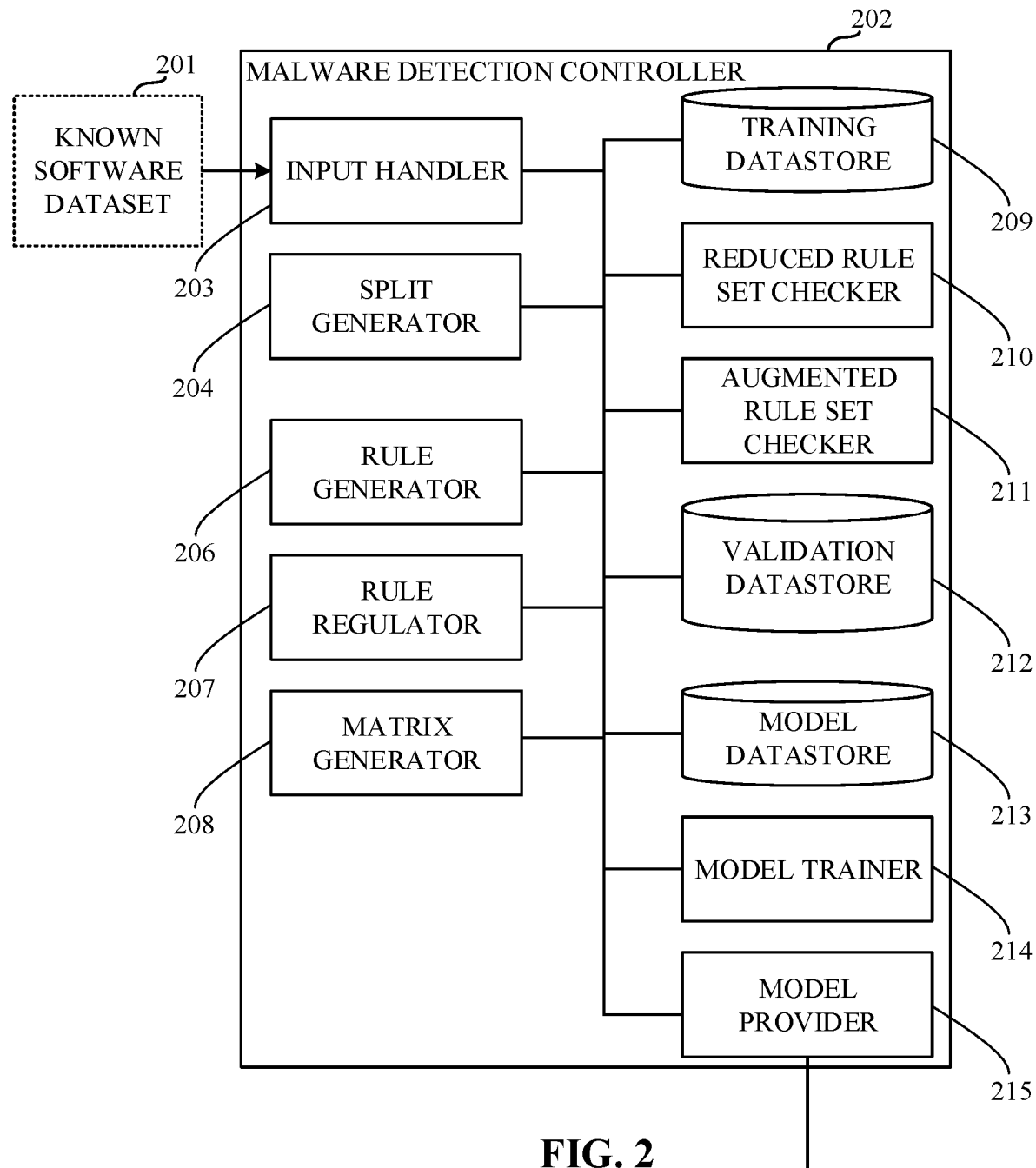
FIG. 2 is a block diagram of an example malware detection controller to create malware detection rules and a machine learning model to operate thereon.

FIG. 2 is a block diagram of an example malware detection controller 202 to create malware detection rules and a machine learning model to operate thereon. The example malware detection controller 202 of FIG. 2 includes an input handler 203, a split generator 204, a rule generator 206, a rule regulator 207, a matrix generator 208, a training datastore 209, a reduced rule set checker 210, an augmented rule set checker 211, a validation datastore 212, a model datastore 213, a model trainer 214, and a model provider 215. The example malware detection controller 202 intakes a known software dataset 201.

In examples disclosed herein, the example malware detection controller 202 receives a known software dataset 201. In examples disclosed herein, the known software dataset 201 represents software (e.g., executable instructions, machine-readable instructions, etc.) that are labeled as either malware or benign.

The example input handler 203 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example input handler 203 accesses a dataset 201 including software(s) (e.g., executable files, script files, machine readable instructions, etc.) that are labeled as either being malware or benign. In some examples, the dataset 201 is a remote dataset (e.g., a dataset stored at a remote location and/or server). In some examples, the dataset 201 is stored locally to the malware detection controller 202. In examples disclosed herein, the dataset 201 includes labels identifying whether particular items in the dataset are malware or are benign.

The example split generator 204 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example split generator 204 divides the known software dataset 201 into smaller data subsets that can be used, for example, to create a rule set and/or train (or validate) a machine learning model.

The rule generator 206 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example rule generator 206 generates a rule set. In examples disclosed herein, the rule set is a group of decision lists that are generated using the first training subset and, if present, any current rule set(s) that may have been provided and/or are stored in the example model datastore 213. In examples disclosed herein, decision lists are used as opposed to decision trees. Decision trees are typically implemented as a single tree that may include many nodes. As a result, the deeply nested structures of a decision tree creates complex decision boundaries. In contrast, decision lists are typically more computationally efficient to execute.

In examples disclosed herein, the example rule generator 206 uses rule one or more criterion to generate a large quantity of partially randomized decision lists. The partially randomized decision lists are Boolean conjunctions that are true for a subset of the records and false for its compliment. In examples disclosed herein, these lists are used to identify patterns, features, and/or other characteristics that can be used as an input to a machine learning model to detect malware or benign software.

In some examples, the rule generator 206, when generating rules, considers prior rules that had been generated (e.g., an existing rule set and/or a differentiator rule set). In examples disclosed herein, the rule generator 206 generates rules in a forward greedy manner. That is, new conditions are considered by appending them to the existing rule and computing a loss function. At each step, the best condition observed is appended to the rule until some stopping criterion is reached. In examples disclosed herein, three stopping criteria are considered: maximum rule length, minimum applicable samples, and minimum loss improvement. However, other stopping criteria may additionally alternatively be used.

The rule regulator 207 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example rule regulator 207 regularizes rules in an augmented rule set to select rules which have predictive power, while discarding rules that do not. In examples disclosed herein, the example rule regulator 207 utilizes a Least Absolute Shrinkage and Selection Operator (LASSO) algorithm to select rules. However, any other rule selection technique may additionally or alternatively be used. LASSO identifies rules which must generalize between the two randomly generated data sets. Using this approach improves the generalizability of the rule set and subsequent model, as well as prevents overfitting. Overfitting of data is an undesirable trait in model generation and is regarded as incorporating noise, randomness, and other non-predictive trends into a model and/or rule set. Thus, the rule generator 206 attempts to explain the dataset by accumulating a set of rules that discriminate between malware and benign software. At the same time, the rule regulator 207 attempts to remove rules in this set by identifying and removing redundant rules or rules that are presumed to be the result of overfitting and hence are not predictive.

In this manner, the iterated rules can be thought of as competing against each other. That is, the rule generator 206 generates potential rules (which may or may not be effective rules), while the rule regulator 207 attempts to remove rules that are not effective. The result of this application of the rule regularization technique is a reduced rule set of predictive rules.

The matrix generator 208 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example matrix generator 208 creates a binary rule matrix representing outputs of the records in a dataset (e.g., a training set) as processed using a set of rules (e.g., an augmented rule set) by the augmented rule set checker 211 and/or the reduced rule set checker 210. In examples disclosed herein, the binary rule matrix is formatted as a matrix having a first number of rows equal to the number of samples in the second training subset and having a second number of columns equal to the number of rules in the augmented rule set. In examples disclosed herein, each cell in the matrix is populated with the binary result of the satisfaction of the indexed rule by the indexed sample (e.g., an indication of whether a particular characteristic (according to the augmented rule set) is present in the corresponding record of the second training subset. That is, the cell is filled with a binary true (e.g., a value of 1) if the rule is satisfied or a binary false (e.g., a value of 0) if the rule is not satisfied. While binary values are used in the example approaches disclosed herein, in some examples, other values may additionally or alternatively be used. For example, integer values may be used, string values may be used, etc.

The example training datastore 209 of the illustrated example of FIG. 2 is implemented by any memory, storage device, and/or storage disc for storing data such as, for example, flash memory, magnetic media, optical media, solid state memory, hard drive(s), thumb drive(s), etc. Furthermore, the data stored in the example training datastore 209 may be in any data format such as, for example, binary data, comma delimited data, tab delimited data, structured query language (SQL) structures, etc. While, in the illustrated example, the training datastore 209 is illustrated as a single device, the example training datastore 209 and/or any other data storage devices described herein may be implemented by any number and/or type(s) of memories. In the illustrated example of FIG. 2, the example training datastore 209 stores a portion of the data contained in the known software dataset 201 originally input into the malware detection controller 202.

The reduced rule set checker 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example reduced rule set checker 210 evaluates the accuracy of the reduced rule set using the validation set.

The augmented rule set checker 211 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example augmented rule set checker 211 processes rules in the augmented rule set using records in a training set to determine the validity of the rules in the augmented rule set.

The example validation datastore 212 of the illustrated example of FIG. 2 is implemented by any memory, storage device, and/or storage disc for storing data such as, for example, flash memory, magnetic media, optical media, solid state memory, hard drive(s), thumb drive(s), etc. Furthermore, the data stored in the example validation datastore 212 may be in any data format such as, for example, binary data, comma delimited data, tab delimited data, structured query language (SQL) structures, etc. While, in the illustrated example, the validation datastore 212 is illustrated as a single device, the example validation datastore 212 and/or any other data storage devices described herein may be implemented by any number and/or type(s) of memories. In the illustrated example of FIG. 2, the example validation datastore 212 stores a portion of the data contained in the known software dataset 201 originally input into the malware detection controller 202.

The example model datastore 213 of the illustrated example of FIG. 2 is implemented by any memory, storage device, and/or storage disc for storing data such as, for example, flash memory, magnetic media, optical media, solid state memory, hard drive(s), thumb drive(s), etc. Furthermore, the data stored in the example model datastore 213 may be in any data format such as, for example, binary data, comma delimited data, tab delimited data, structured query language (SQL) structures, etc. While, in the illustrated example, the model datastore 213 is illustrated as a single device, the example model datastore 213 and/or any other data storage devices described herein may be implemented by any number and/or type(s) of memories. In the illustrated example of FIG. 2, the example model datastore 213 stores rules and/or models used for detection of malware.

The model trainer 214 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The model trainer 214 trains a machine learning model. The example model trainer 214 uses a training algorithm to train a model to operate in accordance with patterns and/or associations based on, for example, training data (e.g., features derived based on the generated rules) and labeled outputs (e.g., indications of whether the data is malware or benign). In examples disclosed herein, ML/AI models are trained using stochastic gradient descent. However, any other training algorithm may additionally or alternatively be used.

Figure 3:
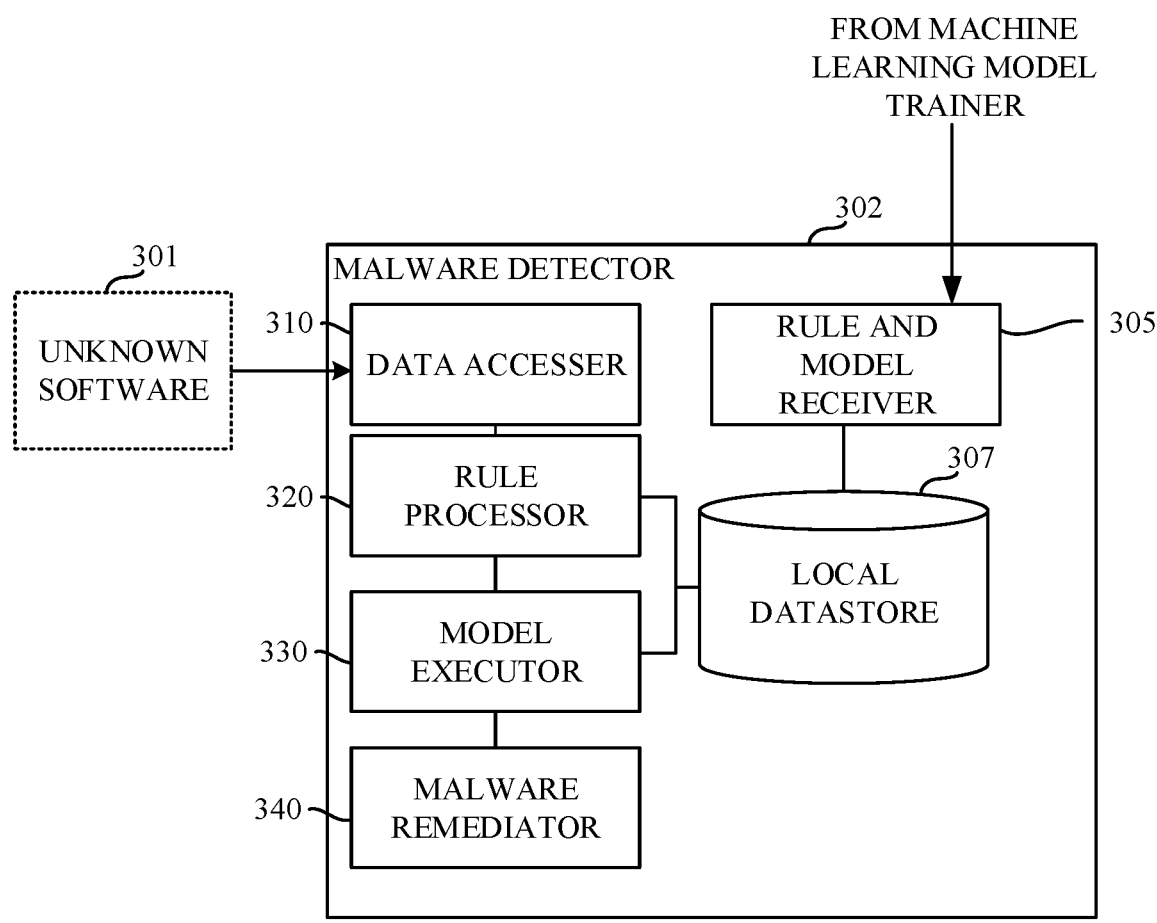
FIG. 3 is a block diagram of an example malware detector to utilize the malware detection rules and machine learning model created by the example malware detection controller of FIG. 2.

The model provider 215 of the illustrated example of FIG. 2 is implemented by a transceiver to enable the example malware detection controller 202 to provide the generated rules and/or model(s) to the example malware detector 302 of FIG. 3. In examples disclosed herein, the model provider 215 is implemented by an Ethernet transceiver that enables the malware detection controller 202 to communicate with the example malware detector 302 via a network such as, for example, the Internet. However, any other approach for enabling rules and/or models to be provided to the malware detector 302 may additionally or alternatively be used.

The example malware detector 302 of FIG. 3 includes a rule and model receiver 305, a local datastore 307, a data accesser 310, a rule processor 320, a model executor 330, and a malware remediator 340.

The example rule and model receiver 305 of the illustrated example of FIG. 3 is implemented by a transceiver to enable the example malware detector 302 to receive the generated rules and/or model(s) from the example malware detection controller 202 of FIG. 2. In examples disclosed herein, the rule and model receiver 305 is implemented by an Ethernet transceiver that enables the malware detector 302 to communicate with the example malware detection controller 202 via a network such as, for example, the Internet. However, any other approach for enabling rules and/or models to be provided to the malware detector 302 may additionally or alternatively be used. In some examples, the rule and model receiver 305 communicates results of the malware detection to the malware detection controller 202 to enable the malware detection controller 202 to use such information in training of subsequent rules and/or models.

The example local datastore 307 of the illustrated example of FIG. 3 is implemented by any memory, storage device, and/or storage disc for storing data such as, for example, flash memory, magnetic media, optical media, solid state memory, hard drive(s), thumb drive(s), etc. Furthermore, the data stored in the example local datastore 307 may be in any data format such as, for example, binary data, comma delimited data, tab delimited data, structured query language (SQL) structures, etc. While, in the illustrated example, the local datastore 307 is illustrated as a single device, the example local datastore 307 and/or any other data storage devices described herein may be implemented by any number and/or type(s) of memories. In the illustrated example of FIG. 3, the example local datastore 307 stores rules and/or models provided by the example malware detection controller 202.

The rule processor 320 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.). The example rule processor 320 analyzes the data using the rules to generate features (e.g., results of each of the rules included in the rule set).

The model executor 330 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The model executor 330 processes the features using the machine learning model to generate an output indicative of whether the data is malware or is benign.

The malware remediator 340 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example malware remediator 340, in response to detection of malware, performs a responsive action. The responsive action may include, for example, deleting the data identified to be malware, quarantining the data (e.g., preventing execution of the data), alerting a user, alerting a system administrator, etc.

While an example manner of implementing the malware detection controller 202 is illustrated in FIG. 2 and an example manner of implementing the malware detector 302 is illustrated in FIG. 3, one or more of the elements, processes and/or devices illustrated in FIGS. 2 and/or 3 may be combined, divided, re-arranged, omitted, eliminated and/or implemented in any other way. Further, the example input handler 203, the example split generator 204, the example rule generator 206, the example rule regulator 207, the example matrix generator 208, the example reduced rule set checker 210, the example augmented rule set checker 211, the example model trainer 214, the example model provider 215, and/or, more generally, the malware detection controller 202 of FIG. 2, and/or the example rule and model receiver 205, the example data accesser 310, the example rule processor 320, the example model executor 330, the example malware remediator 340, and/or, more generally, the example malware detector 302 may be implemented by hardware, software, firmware and/or any combination of hardware, software and/or firmware. Thus, for example, any of the example input handler 203, the example split generator 204, the example rule generator 206, the example rule regulator 207, the example matrix generator 208, the example reduced rule set checker 210, the example augmented rule set checker 211, the example model trainer 214, the example model provider 215, and/or, more generally, the malware detection controller 202 of FIG. 2, and/or the example rule and model receiver 205, the example data accesser 310, the example rule processor 320, the example model executor 330, the example malware remediator 340, and/or, more generally, the example malware detector 302 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input handler 203, the example split generator 204, the example rule generator 206, the example rule regulator 207, the example matrix generator 208, the example reduced rule set checker 210, the example augmented rule set checker 211, the example model trainer 214, the example model provider 215, and/or, more generally, the malware detection controller 202 of FIG. 2, and/or the example rule and model receiver 205, the example data accesser 310, the example rule processor 320, the example model executor 330, the example malware remediator 340, and/or, more generally, the example malware detector 302 is/are hereby expressly defined to include a non-transitory computer readable storage device or storage disk such as a memory, a digital versatile disk (DVD), a compact disk (CD), a Blu-ray disk, etc. including the software and/or firmware. Further still, the example malware detection controller 202 of FIG. 2 and/or the example malware detector 302 of FIG. 3 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
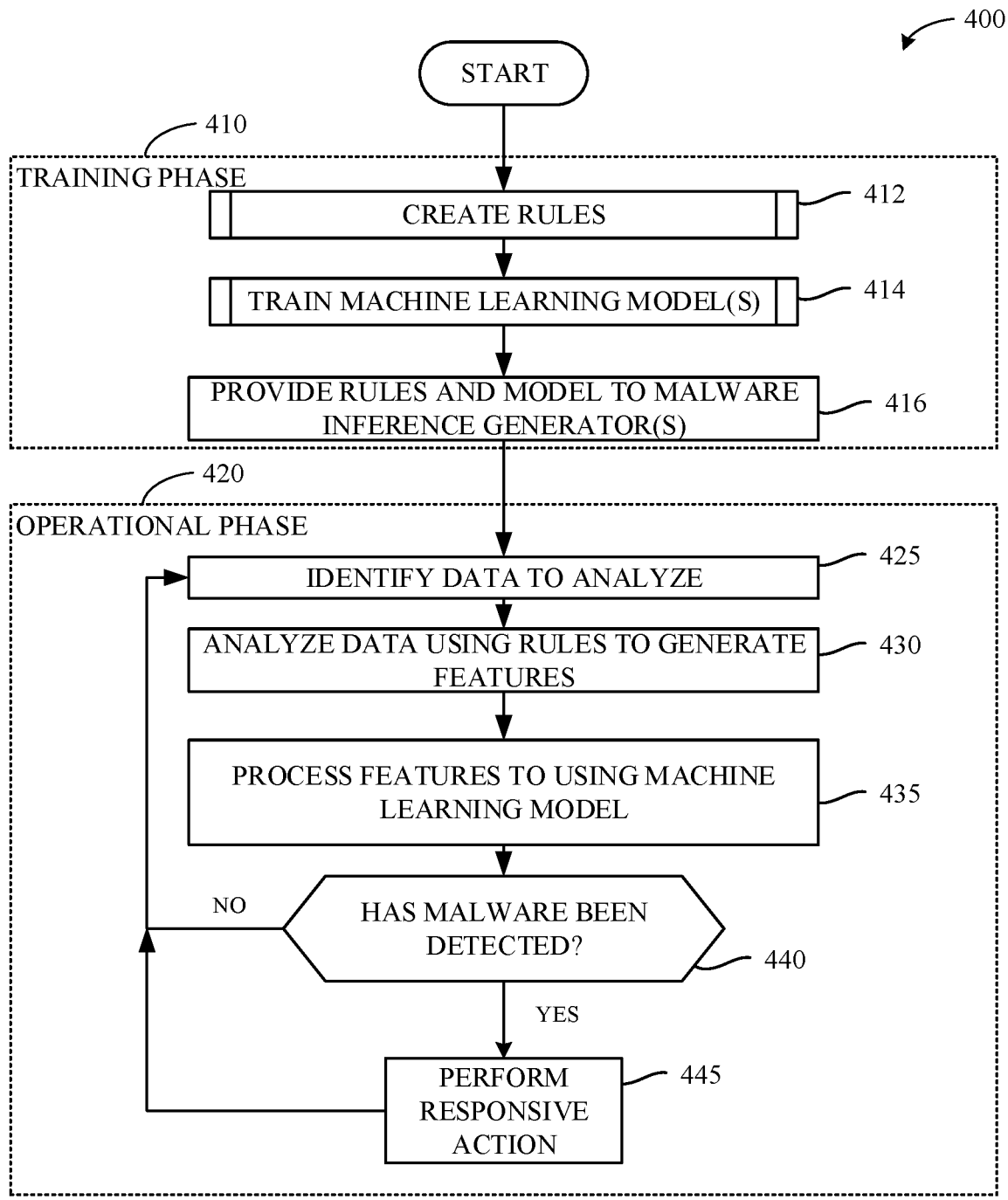
FIG. 4 is a flowchart representative of machine-readable instructions which may be executed to implement the example malware detection controller of FIG. 2 and/or the example malware detector of FIG. 3.
Figure 5:
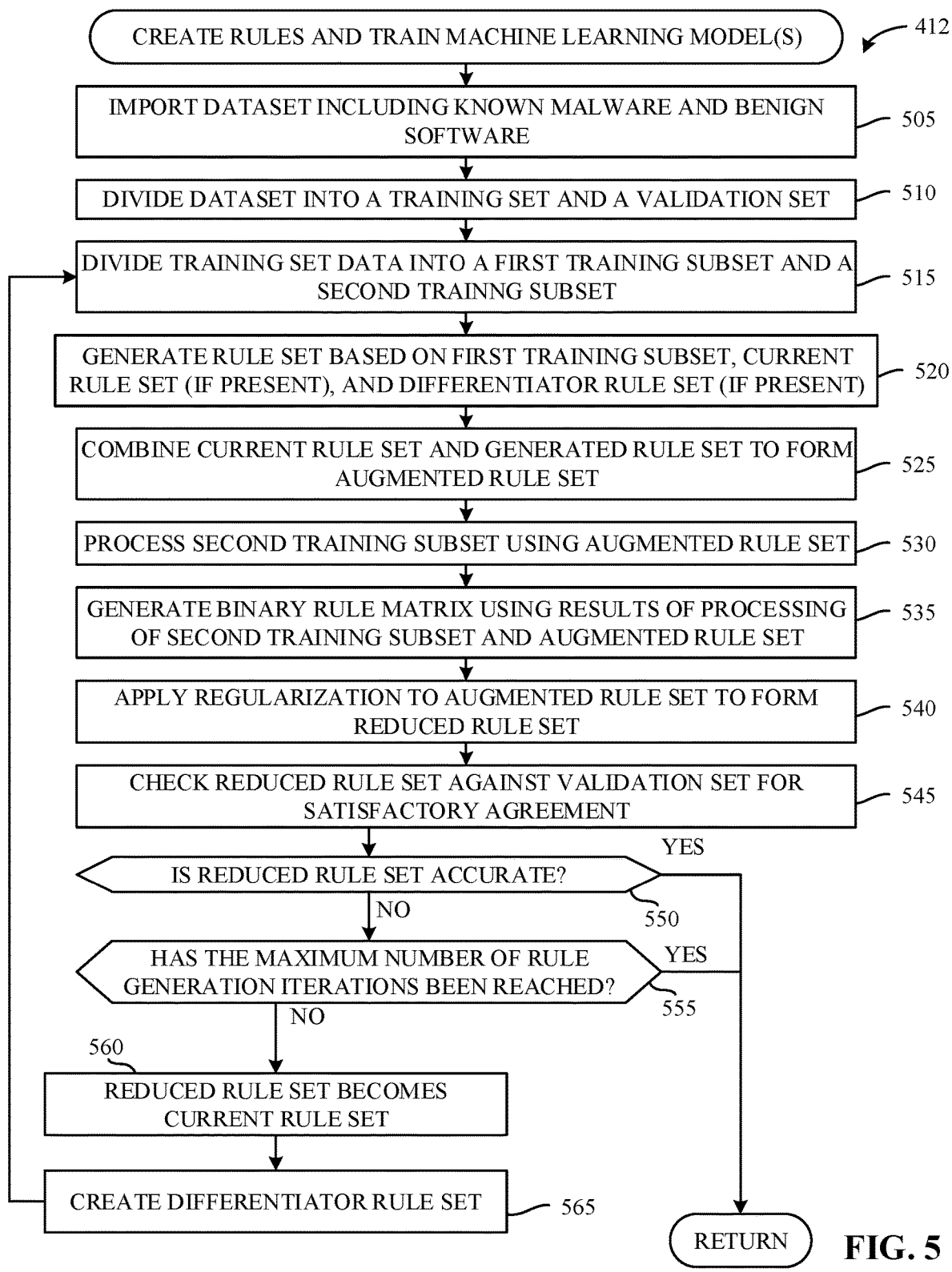
FIG. 5 is a flowchart representative of machine-readable instructions which may be executed to implement the example malware detection controller of FIG. 2 to create malware detection rules.

Flowcharts representative of example hardware logic, machine readable instructions, hardware implemented state machines, and/or any combination thereof for implementing the example malware detection controller 202 of FIG. 2 and/or the example malware detector 302 of FIG. 3 are shown in FIGS. 4, 5, and/or 6. The machine readable instructions may be one or more executable programs or portion(s) of an executable program for execution by a computer processor such as the processor 712, 812 shown in the example processor platform 700, 800 discussed below in connection with FIG. 7 and/or the example processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 712, 812, but the entire program and/or parts thereof could alternatively be executed by a device other than the processor 712, 812 and/or embodied in firmware or dedicated hardware. Further, although the example program is described with reference to the flowcharts illustrated in FIGS. 4, 5, and/or 6, many other methods of implementing the example malware detection controller 202 of FIG. 2 and/or the example malware detector 302 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine-readable instructions which may be executed to implement the example malware detection controller of FIG. 2 and/or the example malware detector of FIG. 3. As noted above, Artificial intelligence (AI), including machine learning (ML), deep learning (DL), and/or other artificial machine-driven logic, enables machines (e.g., computers, logic circuits, etc.) to use a model to process an initial data set to create malware detection rules and a machine learning model that utilizes the outputs of those rules to detect malware.

In general, implementing a ML/AI system involves two phases, a learning/training phase 410 and an inference/operational phase 420. In the learning/training phase 410, the example malware detection controller 202 processes an input dataset to generate malware detection rules. (Block 412). An example approach for creation of rules is disclosed in further detail in connection with FIG. 5. In examples disclosed herein, the rules are used to derive features from an input (e.g., an executable file, a script file, machine readable instructions, etc.) that can be used by a machine learning model to determine whether the input represents malware or is benign.

The example malware detection controller 202 trains a machine learning model. (Block 414). Many different types of machine learning models and/or machine learning architectures exist. In examples disclosed herein, a convolutional neural network (CNN) model is used. Using a CNN model enables efficient classifications of an input (e.g., an autonomous driving program and/or metadata associated therewith) to be classified as valid or invalid. However, other types of machine learning models could additionally or alternatively be used such as, for example, a support vector machine (SVM), a recurrent neural network (RNN), etc.

A training algorithm is used to train a model to operate in accordance with patterns and/or associations based on, for example, training data (e.g., features derived based on the generated rules). In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an error threshold is reached. In examples disclosed herein, training is performed at the malware detection controller 202. Training is performed using hyperparameters that control how the learning is performed (e.g., a learning rate, a number of layers to be used in the machine learning model, etc.). In some examples re-training may be performed. Such re-training may be performed in response to additional training data becoming available, a threshold amount of time elapsing since a prior training, etc.

Training is performed using training data. In examples disclosed herein, the training data includes features derived from input data (e.g., the known software dataset 201) and corresponding labels indicating whether that input data represents malware or is benign. Because supervised training is used, the training data is labeled. Labeling is applied to the training data by a human who has confirmed whether the input software is malware or is benign.

Once training is complete, the example model provider 215 deploys the rules and/or model to the malware detector (s). (Block 416). In examples disclosed herein, the rules and/or model are deployed via a network such as, for example, the Internet. However, any other approach to distributing rules and/or models may additionally or alternatively be used. The rules and model are distributed to the local datastore 307 (e.g., at an edge and/or client device). The rules and model may then be executed by the rule processor 320 and/or model executor 330 to determine whether an input is malicious or benign.

Once trained, the deployed model may be operated in the operational/inference phase 420 to process data. This inference phase can be thought of as the AI "thinking" to generate the output based on what was learned from the training (e.g., by executing the model to apply the learned patterns and/or associations to the live data).

The example data accesser 310 identifies data (e.g., an executable file to be executed, a script file, machine readable instructions, etc.). (Block 425). The example rule processor 320 analyzes the data using the rules to generate features (e.g., results of each of the rules included in the rule set). (Block 430). The example model executor 330 processes the features using the machine learning model to generate an output indicative of whether the data is malware or is benign. (Block 435). In some examples, this output is a confidence score representing a likelihood of the data being malware (or, conversely, being benign). If malware has been detected (e.g., block 440 returns a result of YES), the example malware remediator 340 performs a responsive action. (Block 445). In some examples, malware is detected when a confidence score meets or exceeds a threshold confidence score (e.g., a 70% likelihood that the data is malware). If malware has not been detected (e.g., block 440 returns a result of NO), control returns to block 425 where the process is repeated for subsequent data to be analyzed.

In examples disclosed herein, the responsive action performed by the example malware remediator 340 (at block 445), may include deleting the data, quarantining the data (e.g., preventing execution of the data), alerting a user, alerting a system administrator, etc.

In some examples, the result of the malware detection may be captured and provided as feedback to the malware detection controller 202. By analyzing the feedback, an accuracy of the deployed model can be determined. If the feedback indicates that the accuracy of the deployed model is less than a threshold or other criterion, creation of an updated rule set and/or training of an updated model can be triggered using the feedback and an updated training data set, hyperparameters, etc., to generate an updated, deployed model.

FIG. 5 is a flowchart representative of machine-readable instructions which may be executed to implement the example malware detection controller of FIG. 2 to create malware detection rules. The example process 412 of FIG. 5 begins when the example input handler 203 accesses a dataset 201 including software(s) (e.g., executable files, script files, machine readable instructions, etc.) that are labeled as either being malware or benign. (Block 505). In some examples, the example rule generator 206 additionally accesses an existing rule set and/or machine learning model (e.g., to resume training from a previously stored rule set and/or machine learning model). The example split generator 204 divides the dataset into a training set and a validation set. (Block 510). In examples disclosed herein, the dataset is divided randomly and/or pseudo randomly. However, any approach for dividing the dataset into the training set and the validation set may additionally or alternatively be used. In examples disclosed herein, the training set and the validation set are non-overlapping (e.g., no data included in the training set is also included in the validation set) and exhaustive (e.g., all data included in the initial dataset is included in either the training set or the validation set). However, any other approach for creation of a training set and/or validation set may additionally or alternatively be used. In examples disclosed herein, the training set is stored in training datastore 209, and the validation set data is stored in validation datastore 212.

The example split generator splits the training set into a first training subset and a second training subset. (Block 515). In examples disclosed herein, the training set is divided randomly and/or pseudo randomly. However, any approach for dividing the training set into the first training subset and the second training subset may additionally or alternatively be used. In examples disclosed herein, the first and second training subsets are non-overlapping and exhaustive, with respect to the training set.

The example rule generator 206 generates a rule set. (Block 520). In examples disclosed herein, the rule set is a group of decision lists that are generated using the first training subset and, if present, any current rule set(s) that may have been provided and/or are stored in the example model datastore 213. In examples disclosed herein, the example rule generator 206 uses rule criterion to generate a large quantity of partially randomized decision lists. The partially randomized decision lists are Boolean conjunctions that are true for a subset of the records and false for its compliment. In examples disclosed herein, these lists are used to identify patterns, features, and/or other characteristics that can be used as an input to a machine learning model to detect malware or benign software. A model decision tree 100 is shown in FIG. 1 showing a sample rule path 110 of decisions $C_i$, $C_j$, & $C_k$ denoted by 102, 104, and 106 respectively.

In examples disclosed herein, the rule generation process is partially randomized in that the parameters used as inputs to the algorithm are randomly chosen from some previously selected set of valid values. Further, randomly selected subsets of the records are used to train the decision lists. Both are done to improve the robustness of the subsequently created model by exploring a wider variety of possible patterns. The example rule generator 206 combines the generated rule set with a current rule set to create an augmented rule set. (Block 525). In examples disclosed herein, the most recent version of each rule set, including, for example, the current rule set, the augmented rule set, and a reduced rule set are stored in model datastore 213.

The example augmented rule set checker 211 processes each rule in the augmented rule set using each record included in the second training subset. (Block 530). The example matrix generator 208 creates a binary rule matrix representing outputs of the records in the second training subset as processed using the augmented rule set by the augmented rule set checker 211. (Block 535). In examples disclosed herein, the binary rule matrix is formatted as a matrix having a first number of rows equal to the number of samples in the second training subset and having a second number of columns equal to the number of rules in the augmented rule set. In examples disclosed herein, each cell in the matrix is populated with the binary result of the satisfaction of the indexed rule by the indexed sample (e.g., an indication of whether a particular characteristic (according to the augmented rule set) is present in the corresponding record of the second training subset. That is, the cell is filled with a binary true (e.g., a value of 1) if the rule is satisfied or a binary false (e.g., a value of 0) if the rule is not satisfied. While binary values are used in the example approaches disclosed herein, in some examples, other values may additionally or alternatively be used. For example, integer values may be used, string values may be used, etc.

The example rule regulator 207, using the matrix, regularizes rules in the augmented rule set to select rules which have predictive power, while discarding rules that do not. (Block 540). In examples disclosed herein, the example rule regulator 207 utilizes a Least Absolute Shrinkage and Selection Operator (LASSO) algorithm to select rules. However, any other rule selection technique may additionally or alternatively be used. LASSO identifies rules which must generalize between the two randomly generated data sets. Using this approach improves the generalizability of the rule set and subsequent model, as well as prevents over-fitting. Overfitting of data is an undesirable trait in model generation and is regarded as incorporating noise, randomness, and other non-predictive trends into a model and/or rule set. Thus, the rule generator 206 attempts to explain the dataset by accumulating a set of rules that discriminate between malware and benign software. At the same time, the rule regulator 207 attempts to remove rules in this set by identifying and removing redundant rules or rules that are presumed to be the result of over-fitting and hence are not predictive. In this manner, the iterated rules can be thought of as competing against each other. The result of this application of the rule regularization technique is a reduced rule set of predictive rules.

The example reduced rule set checker 210 evaluates the accuracy of the reduced rule set using the validation set. (Block 545). The example reduced rule set checker 210 compares the accuracy of the reduced rule set to an accuracy threshold. (Block 550). The example reduced rule set checker 210 determines an accuracy of the reduced rule set using the labels provided with the initial dataset (e.g., in connection with the validation set) and a result of the processing of the reduced rule set using the validation set, and compares the calculated accuracy to the accuracy threshold. However, any other approach for determining an accuracy of a rule set may additionally or alternatively be used. For example, an amount of error may instead be calculated and compared to an error threshold.

If the example reduced rule set checker 210 determines that the reduced rule set is not accurate (e.g., block 550 returns a result of NO), the example reduced rule set checker 210 determines whether a maximum number of iterations have been reached. (Block 555). In examples disclosed herein, a number of iterations of the rule generation process is tracked and compared to an iteration threshold to ensure that the rule generation process terminates at some point (e.g., terminate after ten iterations). However, any other approach to ensuring that the rule generation process terminates may additionally or alternatively be used such as, for example, an amount of time spent generating rules (e.g., terminate rule generation after one hour, etc.). If the reduced rule set is not accurate and has not reached a maximum number of iterations (e.g., block 550 returns a result of NO and block 555 returns a result of NO), the example rule generator 206 stores the reduced rule set as the current rule set. (Block 560).

In some examples, records that are currently misclassified (e.g., records that caused reduced accuracy at block 550) can be identified and used for creation of a differentiator rule set. The example rule generator 206 creates the differentiator rule set. (Block 565). In some examples, the execution of block 565 is optional. In some examples, the rule generator 206 creates the differentiator rule set by at least one of boosting, re-weighting, or relabeling rules (e.g., from the reduced rule set). Depending on the method chosen, the output of this portion of the process is either residuals, weights, or new labels that are provided to the rule generator 206 via the differentiator rule set. In examples disclosed herein, the information included in the differentiator rule set is used by the rule generator 206 to create new rules which attempt to improve the areas of weakness of the existing rules.

Differentiator rules are used to help the rule generator 206 create new rules which are specifically designed to correct false negatives and/or false positives. These new rules help the rule set and/or model to correct errors while having minimal effect on correctly classified records. Thus, this adaptive process allows the system to identify types of malware and benign software that it currently does not identify accurately, and to adjust the rules to fix and/or address shortcomings in subsequent rule generation iterations.

Control proceeds to block 515, where the example process of blocks 515 through 656 is repeated until the reduced rule set is determined to be accurate (e.g., block 550 returns a result of YES) or a maximum number of rule generation iterations has been reached (e.g., block 555 returns a result of YES). Upon subsequent iterations, the example rule generator 206, at block 520, utilizes the differentiator rule set when creating new rules.

Upon either the reduced rule set being identified as accurate (e.g., block 550 returning a result of YES), or a threshold number of rule generation iterations being reached (e.g., block 555 returning a result of YES), control returns to FIG. 4, where the example model trainer 214 trains a machine learning model. (Block 414). An example approach for training a machine learning model is disclosed in further detail in connection with FIG. 6. The example process 412 of FIG. 5 then terminates, but may be re-executed to create a rule set and/or machine learning model at a later time (e.g., to perform re-training).

Figure 6:
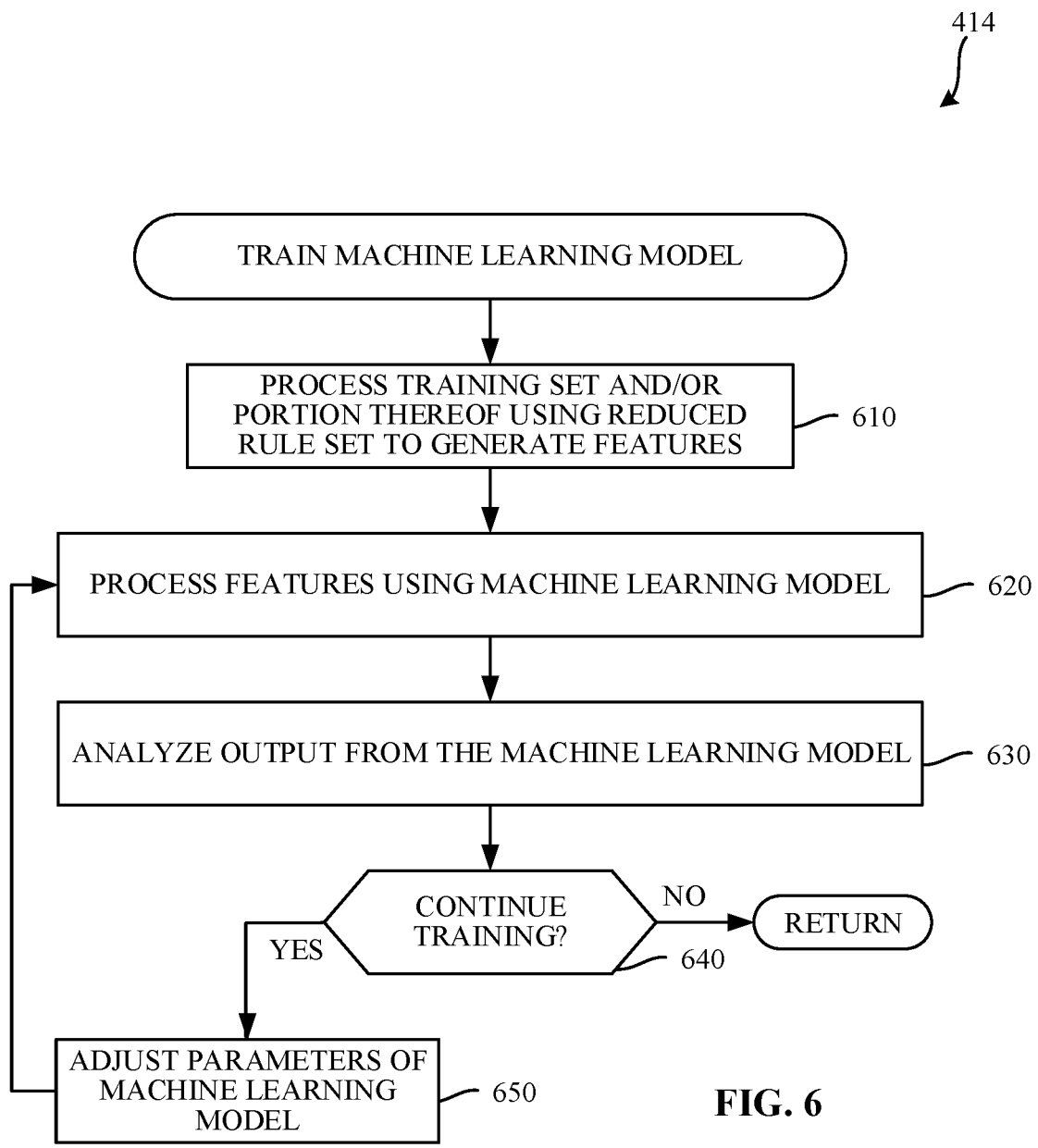
FIG. 6 is a flowchart representative of alternative machine-readable instructions which may be executed to implement the example malware detection controller of FIG. 2 to train a machine learning model.

FIG. 6 is a flowchart representative of alternative machine-readable instructions which may be executed to implement the example malware detection controller 202 of FIG. 2 to train a machine learning model. The example process 580 of FIG. 6 begins when the example reduced rule set checker 210 processes the training data using the reduced rule set to generate features that will be used as inputs to the machine learning model. (Block 610). These features and their associated labels (e.g., malware or benign) are passed to the model trainer 214 for creation of the machine learning model.

The example model trainer 214 utilizes a training algorithm to train a model to operate in accordance with patterns and/or associations based on, for example, training data (e.g., the features and expected label outputs). In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

The example model trainer 214 process the features and/or a portion thereof using the machine learning model stored in the model datastore 213. (Block 620). The example model trainer 214 reviews the output of the model execution to determine an amount of error of the machine learning model. (Block 630). For example, the model trainer 214 reviews the outputs of the machine learning model to determine whether the outputs from the model match the expected labeled outputs.

The example model trainer 214 determines whether to continue training. (Block 640). In examples disclosed herein, the example model trainer 214 determines whether to continue training based on whether the calculated amount of error (determined at block 630) exceeds a threshold amount of error. (Block 640). If model training is to proceed (e.g., block 640 returns a result of YES), the example model trainer 214 adjusts parameters of the machine learning model. (Block 650). In some examples, the amount of adjustment to the parameters of the machine learning model is based on the calculated amount of error. Control then proceeds to block 620, where the process of blocks 620 through 650 is repeated until the calculated amount of error is less than the threshold amount of error (e.g., until block 640 returns a result of NO).

Once training is complete, control returns to block 416, where the reduced rule set and/or model is deployed for use by the malware detector 302. The example process of FIG. 6 then terminates.

Figure 7:
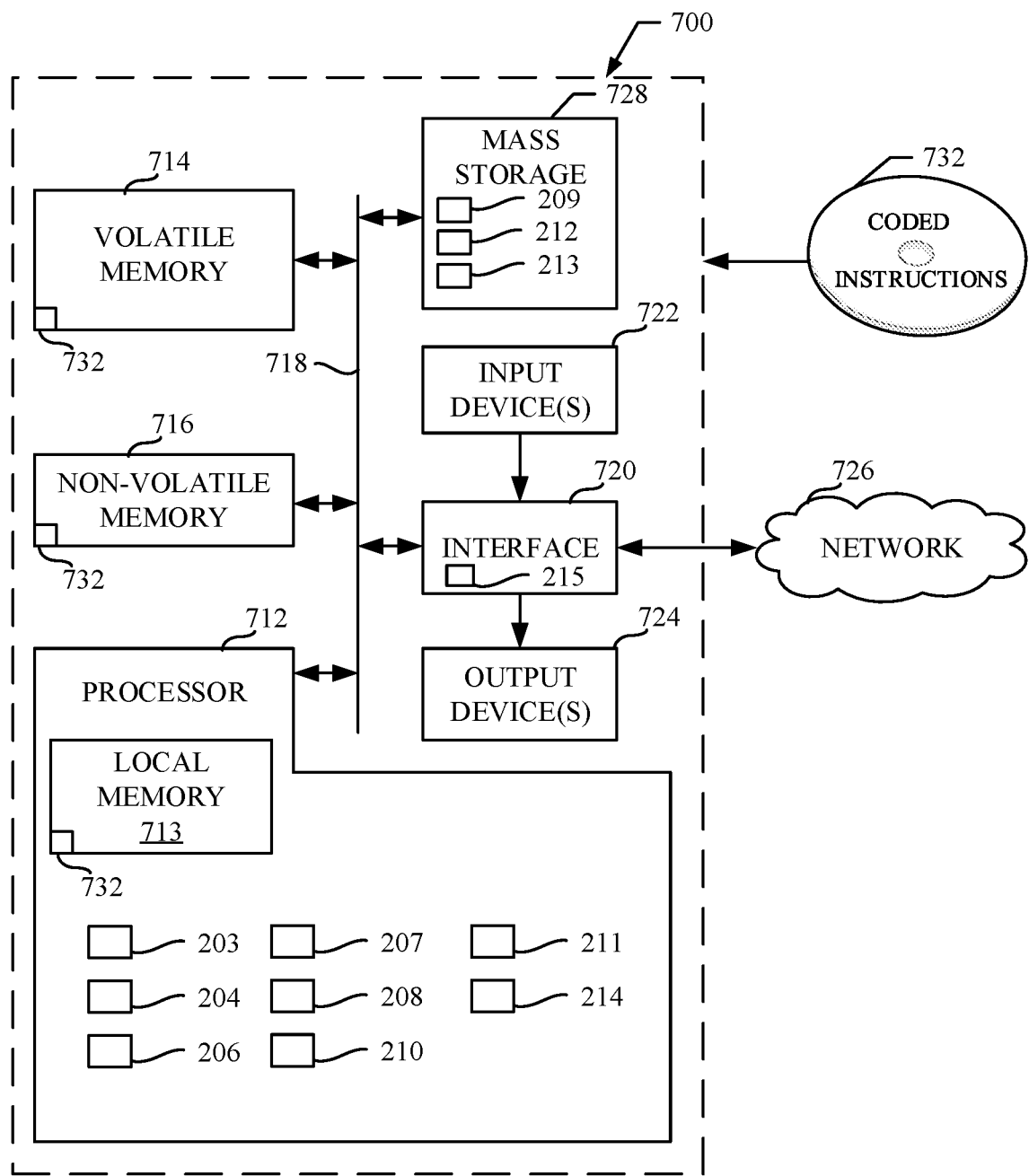
FIG. 7 is a block diagram of an example processor platform structured to execute the instructions of FIGS. 4, 5, and/or 6 to implement the example malware detection controller 202 of FIG. 2.

FIG. 7 is a block diagram of an example processor platform 700 structured to execute the instructions of FIGS. 4, 5, and/or 6 to implement the example malware detection controller 202 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input handler 203, the example split generator 204, the example rule generator 206, the example rule regulator 207, the example matrix generator 208, the example reduced rule set checker 210, the example augmented rule set checker 211, and the example model trainer 214.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc. The example interface circuit 720 may be used to implement the example model provider 215.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4, 5, and/or 6 may be stored in the mass storage device 728, in the volatile memory 714, in the non-volatile memory 716, and/or on a removable non-transitory computer readable storage medium such as a CD or DVD. The example mass storage 728 implements the example training datastore 209, the example validation datastore 212, and the example model datastore 213.

Figure 8:
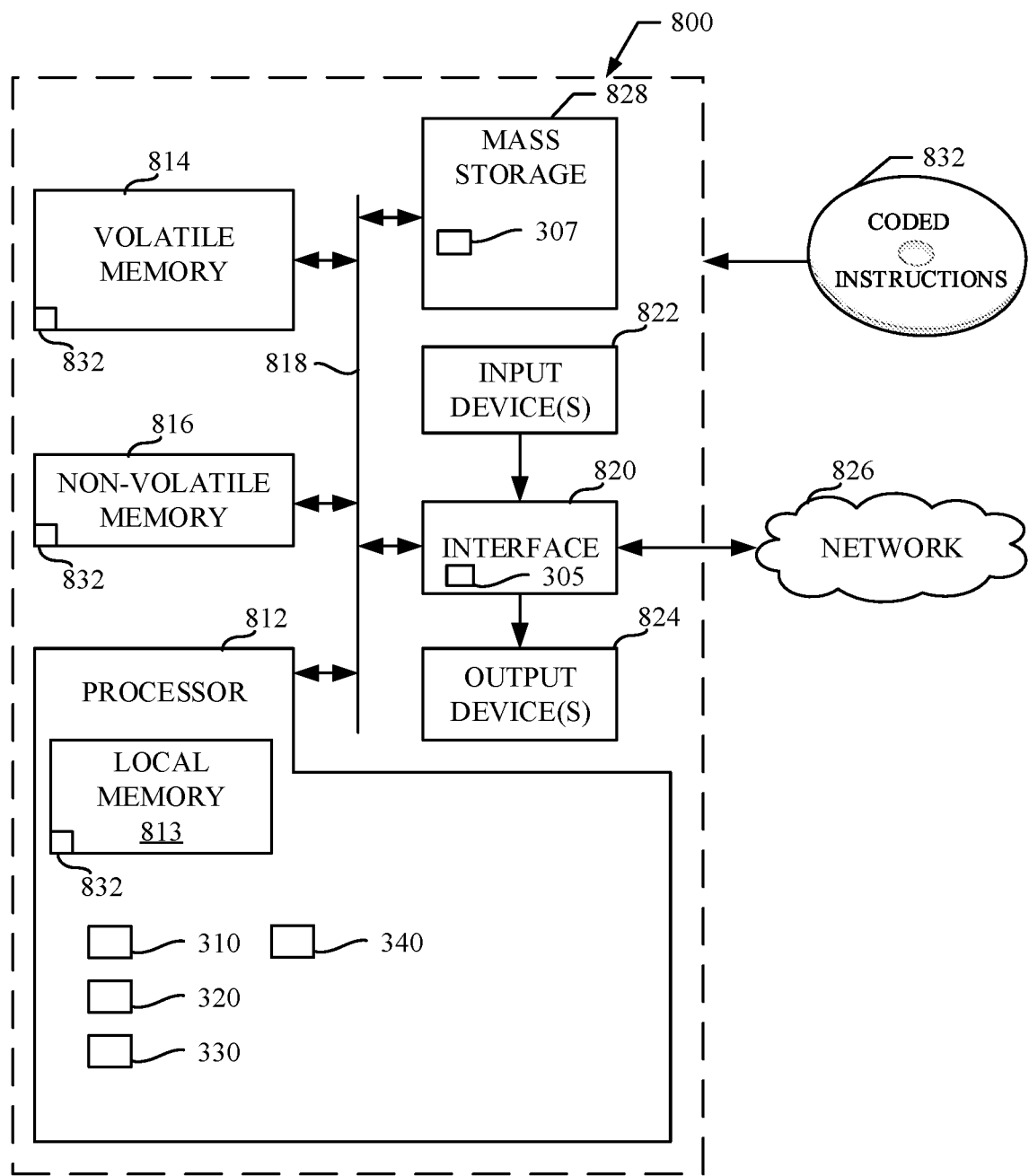
FIG. 8 is a block diagram of an example processor platform structured to execute the instructions of FIG. 4 to implement the example malware detector of FIG. 3.

FIG. 8 is a block diagram of an example processor platform 800 structured to execute the instructions of FIG. 4 to implement the example malware detector 302 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data accesser 310, the example rule processor 320, the example model executor 330, and the example malware remediator 340.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 820 implements the example rule and model receiver 305.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 4 may be stored in the mass storage device 828, in the volatile memory 814, in the non-volatile memory 816, and/or on a removable non-transitory computer readable storage medium such as a CD or DVD. In this example, the example mass storage device 828 implements the example local datastore 307.

From the foregoing, it will be appreciated that example methods, apparatus and articles of manufacture have been disclosed that enable creation of rules and/or machine learning models for malware detection. The disclosed methods, apparatus and articles of manufacture improve the efficiency of using a computing device by generating rule sets that have been condensed to be computationally more efficient as well as produce features that are more dispositive of whether a file (e.g., an executable) is malware. The disclosed methods, apparatus and articles of manufacture are accordingly directed to one or more improvement(s) in the functioning of a computer.

Example 1 includes an apparatus to generate a rule set for detecting malware, the apparatus comprising a rule generator to generate an augmented rule set based on a first training data set, a matrix generator to create a matrix using the augmented rule set and a second training data set, a rule regulator to apply regularization to the augmented rule set based on the matrix to remove at least one rule from the augmented rule set, the rule regulator to create a reduced rule set, and a reduced rule set checker to validate the reduced rule set.

Example 2 includes the apparatus of example 1, wherein the rule regulator is to select any number of rules for removal using a Least Absolute Shrinkage and Selection Operator algorithm.

Example 3 includes the apparatus of example 1, wherein a third training data set includes labels to indicate whether a corresponding item in the third training data set is malware, the apparatus further including a model trainer to process the third training data set using the reduced rule set to create features, and train a machine learning model using the created features and the corresponding labels.

Example 4 includes the apparatus of example 3, further including a model provider to provide the reduced rule set and the machine learning model to a malware detector.

Example 5 includes the apparatus of example 1, wherein the rule generator is to generate the augmented rule set by incorporating an existing rule set into the augmented rule set.

Example 6 includes the apparatus of example 1, wherein the rule generator is further to, in response to the determination that the reduced rule set is not valid, create a differentiator rule set, wherein the rule generator is to generate the augmented rule set based on the differentiator rule set.

Example 7 includes the apparatus of example 6, wherein the rule generator is to create the differentiator rule set by at least one of boosting, re-weighting, or relabeling rules in the reduced rule set.

Example 8 includes the apparatus of example 1, wherein the matrix is a binary rule matrix.

Example 9 includes At least one non-transitory computer readable medium comprising instructions that, when executed, cause at least one processor to at least generate an augmented rule set based on a first training data set, process a second training data set using the augmented rule set to create a matrix, apply regularization to the augmented rule set based on the matrix to form a reduced rule set, the regularization to remove rules from the augmented rule set, and validate the reduced rule set.

Example 10 includes the at least one non-transitory computer readable medium of example 9, wherein the instructions, when executed, cause the at least one processor to apply the regularization by selecting the rules for removal using a Least Absolute Shrinkage and Selection Operator algorithm.

Example 11 includes the at least one non-transitory computer readable medium of example 9, wherein a third training data set includes labels to indicate whether a corresponding item in the third training data set is malware or benign, and the instructions, when executed, further cause the at least one processor to, in response to validation of the reduced rule set process the third training data set using the reduced rule set to create features, train a machine learning model using the created features and the corresponding labels.

Example 12 includes the at least one non-transitory computer readable medium of example 11, wherein the instructions, when executed, further cause the at least one processor to provide the reduced rule set and the machine learning model to a malware detector.

Example 13 includes the at least one non-transitory computer readable medium of example 9, wherein the instructions, when executed, cause the at least one processor to generate the augmented rule set by incorporating an existing rule set into the augmented rule set.

Example 14 includes the at least one non-transitory computer readable medium of example 9, wherein the instructions, when executed, cause the at least one processor to, in response to the determination that the reduced rule set is not satisfactory, create a differentiator rule set, wherein the generating of the augmented rule set is further based on the differentiator rule set.

Example 15 includes the at least one non-transitory computer readable medium of example 14, wherein the instructions, when executed, cause the at least one processor to create the differentiator rule set by at least one of boosting, re-weighting, or relabeling rules in the reduced rule set.

Example 16 includes a method of generating a rule set for detecting malware, the method comprising generating, by executing an instruction with a processor, an augmented rule set based on a first training data set, processing, by executing an instruction with the processor, a second training data set using the augmented rule set to create a matrix, applying regularization, by executing an instruction with the processor, to the augmented rule set based on the matrix to form a reduced rule set, the regularization to remove rules from the augmented rule set, and validating, by executing an instruction with the processor, the reduced rule set.

Example 17 includes the method of example 16, wherein the applying of the regularization includes selecting the rules for removal using a Least Absolute Shrinkage and Selection Operator algorithm.

Example 18 includes the method of example 16, wherein a third training data set includes labels to indicate whether a corresponding item in the third training data set is malware or benign, the method further including, in response to validation of the reduced rule set processing the third training data set using the reduced rule set to create features, training a machine learning model using the created features and the corresponding labels.

Example 19 includes the method of example 18, further including providing the reduced rule set and the machine learning model to a malware detector.

Example 20 includes the method of example 16, wherein the generating of the augmented rule set includes incorporating an existing rule set into the augmented rule set.

Example 21 includes the method of example 16, further including, in response to the determination that the reduced rule set is not satisfactory, creating a differentiator rule set, wherein the generating of the augmented rule set is further based on the differentiator rule set.

Example 22 includes the method of example 21, wherein the differentiator rule set is created by at least one of boosting, re-weighting, or relabeling rules in the reduced rule set. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to generate a rule set for detecting malware, the apparatus comprising:
a rule generator to, in response to a determination that a rule of the rule set resulted in an invalid classification of a first record, generate an augmented rule set based on a first training dataset, the augmented rule set to adjust the rule to remediate the invalid classification;
a matrix generator to create a matrix based on a classification of a second record of a second training data set, the classification to be generated using the augmented rule set;
a rule regulator to apply regularization to the augmented rule set based on the matrix to remove a number of rules from the augmented rule set to create a reduced rule set; and
a reduced rule set checker to validate the reduced rule set.

2. The apparatus of claim 1, wherein the rule regulator is to select the number of rules for removal using a Least Absolute Shrinkage and Selection Operator algorithm.

3. The apparatus of claim 1, wherein a third training dataset includes labels to indicate whether a corresponding record in the third training dataset is malicious, and the apparatus further including a model trainer to:
process the third training dataset using the reduced rule set to create features; and
train a machine learning model using the features and the labels.

4. The apparatus of claim 3, further including a model provider to provide the reduced rule set and the machine learning model to a malware detector.

5. The apparatus of claim 1, wherein the rule generator is to generate the augmented rule set by incorporating an existing rule set into the augmented rule set.

6. The apparatus of claim 1, wherein the rule generator is to:
create a differentiator rule set; and
generate the augmented rule set based on the differentiator rule set.

7. The apparatus of claim 6, wherein the rule generator is to create the differentiator rule set by at least one of boosting, re-weighting, or relabeling the rule.

8. The apparatus of claim 1, wherein the matrix is a binary rule matrix.

9. At least one non-transitory computer readable medium comprising instructions that, when executed, cause at least one processor to at least:
in response to a determination that a rule of a rule set resulted in an invalid classification of a first record, generate an augmented rule set based on a first training dataset, the augmented rule set to adjust the rule to remediate the invalid classification;
process a second record of a second training dataset using the augmented rule set to create a matrix;
apply regularization to the augmented rule set based on the matrix to form a reduced rule set, the regularization to remove a number of rules from the augmented rule set; and
validate the reduced rule set.

10. The at least one non-transitory computer readable medium of claim 9, wherein the instructions, when executed, cause the at least one processor to apply the regularization by selecting the number of rules for removal using a Least Absolute Shrinkage and Selection Operator algorithm.

11. The at least one non-transitory computer readable medium of claim 9, wherein a third training dataset includes labels to indicate whether a corresponding record in the third training dataset is malicious or benign, and the instructions, when executed, further cause the at least one processor to, in response to validation of the reduced rule set:
process the third training dataset using the reduced rule set to create features; and
train a machine learning model using the features and the labels.

12. The at least one non-transitory computer readable medium of claim 11, wherein the instructions, when executed, further cause the at least one processor to provide the reduced rule set and the machine learning model to a malware detector.

13. The at least one non-transitory computer readable medium of claim 9, wherein the instructions, when executed, cause the at least one processor to generate the augmented rule set by incorporating an existing rule set into the augmented rule set.

14. The at least one non-transitory computer readable medium of claim 9, wherein the instructions, when executed, cause the at least one processor to;
create a differentiator rule set; and
generate the augmented rule set based on the differentiator rule set.

15. The at least one non-transitory computer readable medium of claim 14, wherein the instructions, when executed, cause the at least one processor to create the differentiator rule set by at least one of boosting, re-weighting, or relabeling the rule.

16. A method of generating a rule set for detecting malware, the method comprising:
in response to a determination that a rule of the rule set resulted in an invalid classification of a first record, generating, by executing an instruction with a processor, an augmented rule set based on a first training dataset, the augmented rule set to adjust the rule to remediate the invalid classification;
processing, by executing an instruction with the processor, a second record of a second training dataset using the augmented rule set to create a matrix;
applying regularization, by executing an instruction with the processor, to the augmented rule set based on the matrix to form a reduced rule set, the regularization to remove a number of rules from the augmented rule set; and
validating, by executing an instruction with the processor, the reduced rule set.

17. The method of claim 16, wherein applying of the regularization includes selecting the number of rules for removal using a Least Absolute Shrinkage and Selection Operator algorithm.

18. The method of claim 16, wherein a third training dataset includes labels to indicate whether a corresponding record in the third training dataset is malicious or benign, the method further including, in response to validation of the reduced rule set:
processing the third training dataset using the reduced rule set to create features; and
training a machine learning model using the features and the labels.

19. The method of claim 18, further including providing the reduced rule set and the machine learning model to a malware detector.

20. The method of claim 16, wherein the generating of the augmented rule set includes incorporating an existing rule set into the augmented rule set.

21. The method of claim 16, further including:
creating a differentiator rule set; and
generating the augmented rule set based on the differentiator rule set.

22. The method of claim 21, wherein the differentiator rule set is created by at least one of boosting, re-weighting, or relabeling the rule.

* * * * *